United States Patent
Lee

(10) Patent No.: US 12,452,953 B2
(45) Date of Patent: Oct. 21, 2025

(54) ELECTRONIC DEVICE AND METHOD FOR CONTROLLING CONNECTION WITH COMMUNICATION NETWORK IN ELECTRONIC DEVICE

(71) Applicant: Samsung Electronics Co., Ltd., Suwon-si (KR)

(72) Inventor: Keonyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 574 days.

(21) Appl. No.: 17/659,464

(22) Filed: Apr. 15, 2022

(65) Prior Publication Data

US 2022/0346182 A1 Oct. 27, 2022

Related U.S. Application Data

(63) Continuation of application No. PCT/KR2022/002880, filed on Feb. 28, 2022.

(30) Foreign Application Priority Data

Apr. 16, 2021 (KR) .................. 10-2021-0049915

(51) Int. Cl.
*H04W 76/38* (2018.01)
*H04W 76/20* (2018.01)
*H04W 80/02* (2009.01)

(52) U.S. Cl.
CPC ........... *H04W 76/38* (2018.02); *H04W 76/20* (2018.02); *H04W 80/02* (2013.01)

(58) Field of Classification Search
CPC ............. H04W 76/28; H04W 52/0235; H04W 52/0216; H04W 80/02; H04W 76/20; H04W 76/38
See application file for complete search history.

(56) References Cited

U.S. PATENT DOCUMENTS

| 8,185,165 B2 | 5/2012 | Beninghaus et al. |
| 2005/0063304 A1 | 3/2005 | Sillasto et al. |

(Continued)

FOREIGN PATENT DOCUMENTS

| KR | 20120039382 A | 4/2012 |
| KR | 20170014990 A | 2/2017 |

(Continued)

OTHER PUBLICATIONS

3GPP TS 38.321 V16.5.0 (Jun. 2021); Technical Specification; 3rd Generation Partnership Project; Technical Specification Group Radio Access Network; NR; Medium Access Control (MAC) protocol specification (Release 16); 157 pages.

(Continued)

*Primary Examiner* — Sulaiman Nooristany

(57) ABSTRACT

According to various embodiments, an electronic device may comprise a wireless communication circuit, an application processor, and a communication processor. The communication processor may be configured to receive data inactivity timer information through the wireless communication circuit from a base station, drive a data inactivity timer based on a first setting value corresponding to the received data inactivity timer information, in a radio resource control (RRC) connected state for the base station, receive a data inactivity-related event from the application processor, change the first setting value to a second setting value in response to the reception of the data inactivity-related event, and release an RRC connection for the base station in response to identifying that the data inactivity timer expires based on the changed second setting value. Other various embodiments are possible as well.

16 Claims, 14 Drawing Sheets

(56) References Cited

U.S. PATENT DOCUMENTS

| | | |
|---|---|---|
| 2012/0094722 A1 | 4/2012 | Kim |
| 2012/0281561 A1 | 11/2012 | Shukla et al. |
| 2014/0064134 A1 | 3/2014 | Huang et al. |
| 2014/0226542 A1 | 8/2014 | Gupta et al. |
| 2015/0045010 A1 | 2/2015 | Oonaru |
| 2015/0382298 A1* | 12/2015 | Müller .................. H04W 72/20 370/311 |
| 2017/0359783 A1 | 12/2017 | Vangala et al. |
| 2017/0367139 A1 | 12/2017 | Jang et al. |
| 2018/0192468 A1* | 7/2018 | Martin .............. H04W 52/0216 |
| 2019/0053324 A1* | 2/2019 | Tseng .................. H04W 76/30 |
| 2019/0254104 A1 | 8/2019 | Gurumoorthy et al. |
| 2020/0029237 A1 | 1/2020 | Kim et al. |
| 2020/0059991 A1 | 2/2020 | Wu |
| 2020/0205220 A1* | 6/2020 | Lee ........................ H04W 76/38 |
| 2020/0260377 A1 | 8/2020 | Jin et al. |
| 2020/0323032 A1 | 10/2020 | Kim et al. |
| 2021/0076308 A1 | 3/2021 | Kim et al. |
| 2022/0132417 A1* | 4/2022 | Maleki .............. H04W 52/0216 |

FOREIGN PATENT DOCUMENTS

| | | |
|---|---|---|
| KR | 10-2018-0108150 A | 10/2018 |
| KR | 10-2019-0128956 A | 11/2019 |
| KR | 10-2020-0098178 A | 8/2020 |
| KR | 10-2020-0117847 A | 10/2020 |
| WO | 2021056524 A1 | 4/2021 |

OTHER PUBLICATIONS

3GPP TS 38.331 V16.5.0 (Jun. 2021); Technical Specification; 3rd Generation Partnership Project; Technical Specification Group Radio Access Network; NR; Radio Resource Control (RRC) protocol specification (Release 16); 959 pages.

International Search Report and Written Opinion of the International Searching Authority dated Jun. 2, 2022, in connection with International Application No. PCT/KR2022/002880, 9 pages.

Supplementary European Search Report dated Aug. 9, 2024, in connection with European Patent Application No. 22788255.2, 10 pages.

* cited by examiner

ELECTRONIC DEVICE AND METHOD FOR CONTROLLING CONNECTION WITH COMMUNICATION NETWORK IN ELECTRONIC DEVICE

CROSS-REFERENCE TO RELATED APPLICATIONS

This application is a bypass continuation of International Application No. PCT/KR2022/002880, filed on Feb. 28, 2022, and claims priority to Korean Patent Application No 10-2021-0049915, filed on Apr. 16, 2021, in the Korean Intellectual Property Office, the disclosures of which are incorporated by reference herein in their entirety.

BACKGROUND

1. Field

Various embodiments of the disclosure relate to an electronic device and a method for controlling a connection with a communication network in the electronic device.

2. Description of Related Art

As mobile communication technologies are developed, a portable terminal that provides various functions has become popular. Accordingly, an effort to develop a $5^{th}$ generation (5G) communication system is being made in order to meet wireless data traffic demand which is increasing. In addition to implementation in a frequency band that the 3G communication system and the long term evolution (LTE) communication system used to use, implementation of the 5G communication system in a higher frequency band (e.g., 25 to 60 GHz band) is being considered in order to provide high data transmission speed for high data transmission rate.

In the 5G communication system, technologies such as beamforming, massive MIMO, full dimensional MIMO (FD-MIMO), an array antenna, analog beam-forming, and a large scale antenna are discussed to mitigate a propagation path loss in the mmWave band and to increase a propagation transmission distance.

As a method of implementing 5G communication, a standalone (SA) scheme and a non-standalone (NSA) scheme are being considered. Among them, the SA scheme may be a scheme that uses only a new radio (NR) system, and the NAS scheme may be a scheme that uses the NR system together with the legacy LTE system. In the NSA scheme, a user equipment (UE) may use an eNB in an LTE system, and a gNB in the NR system. A technology in which a UE enables different communication systems is referred to as dual connectivity.

SUMMARY

An electronic device which is in a state of connection with a base station (e.g., radio resource control (RRC) connection state) may release the RRC connection if there is no data transmitted/received to/from the network (e.g., the base station) during a set time.

For example, in a case where a time set for releasing the RRC connection is set to a fixed value, even when the state in which no data is transmitted/received to/from the network is expected to last, the electronic device may unnecessarily consume current due to the need for maintaining the state of connection with the base station.

According to various embodiments, there may be provided an electronic device controlling to adjust the time set for releasing the RRC connection when the state in which there is no data transmitted/received to/from the network is expected to last and a method for controlling connection with a communication network in the electronic device.

According to various embodiments, an electronic device may comprise a wireless communication circuit, an application processor, and a communication processor. The communication processor may be configured to receive data inactivity timer information through the wireless communication circuit from a base station, drive a data inactivity timer based on a first setting value corresponding to the received data inactivity timer information, in a radio resource control (RRC) connected state for the base station, receive a data inactivity-related event from the application processor, change the first setting value to a second setting value in response to the reception of the data inactivity-related event, and release an RRC connection for the base station in response to identifying that the data inactivity timer expires based on the changed second setting value.

According to various embodiments, a method for controlling connection with a communication network in an electronic device may comprise receiving data inactivity timer information from a base station, by a communication processor, driving a data inactivity timer based on a first setting value corresponding to the received data inactivity timer information, in a radio resource control (RRC) connected state for the base station, receiving a data inactivity-related event from an application processor, by the communication processor, changing the first setting value to a second setting value in response to the reception of the data inactivity-related event, and releasing an RRC connection for the base station in response to identifying that the data inactivity timer expires based on the changed second setting value.

According to various embodiments, it is possible to reduce current consumption in an electronic device by adjusting the time set for releasing RRC when a state of no data transmission/reception with a network is expected to last in the electronic device.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
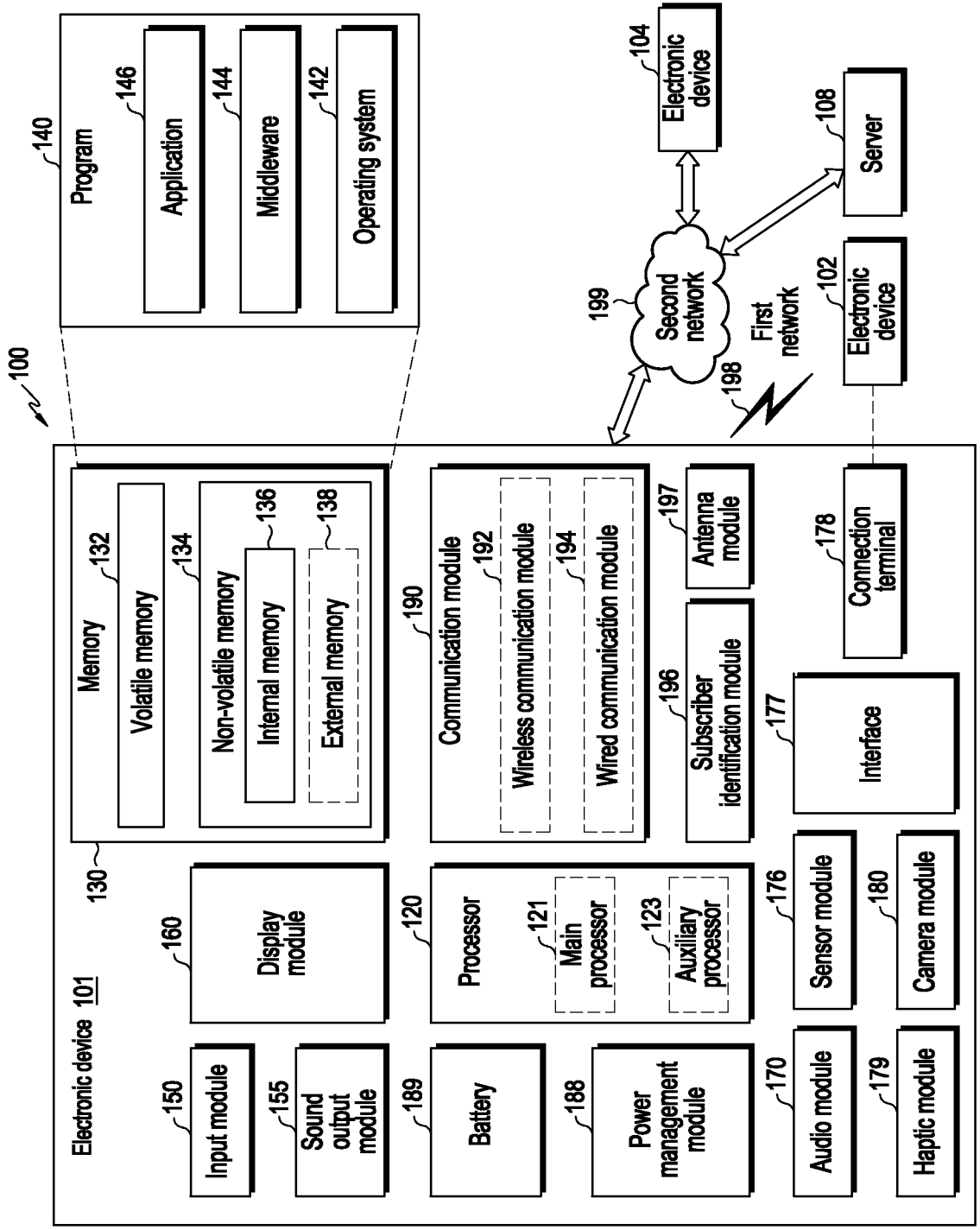
FIG. 1 is a block diagram illustrating an electronic device in a network environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
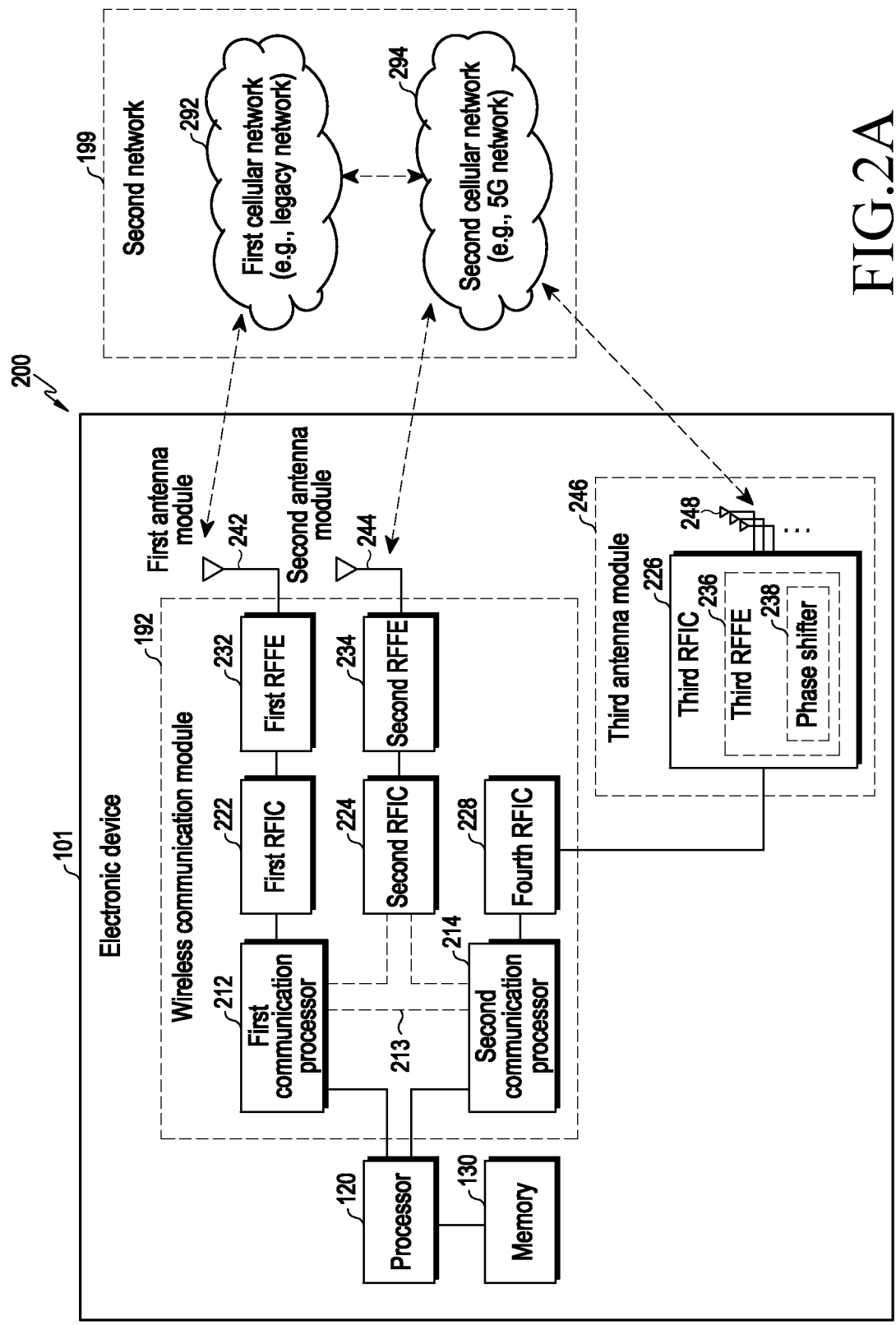
FIG. 2A is a block diagram illustrating an electronic device for supporting legacy network communication and 5G network communication according to various embodiments of the present disclosure.

FIG. 2A is a block diagram 200 illustrating an electronic device 101 for supporting legacy network communication and 5G network communication according to various embodiments of the present disclosure. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
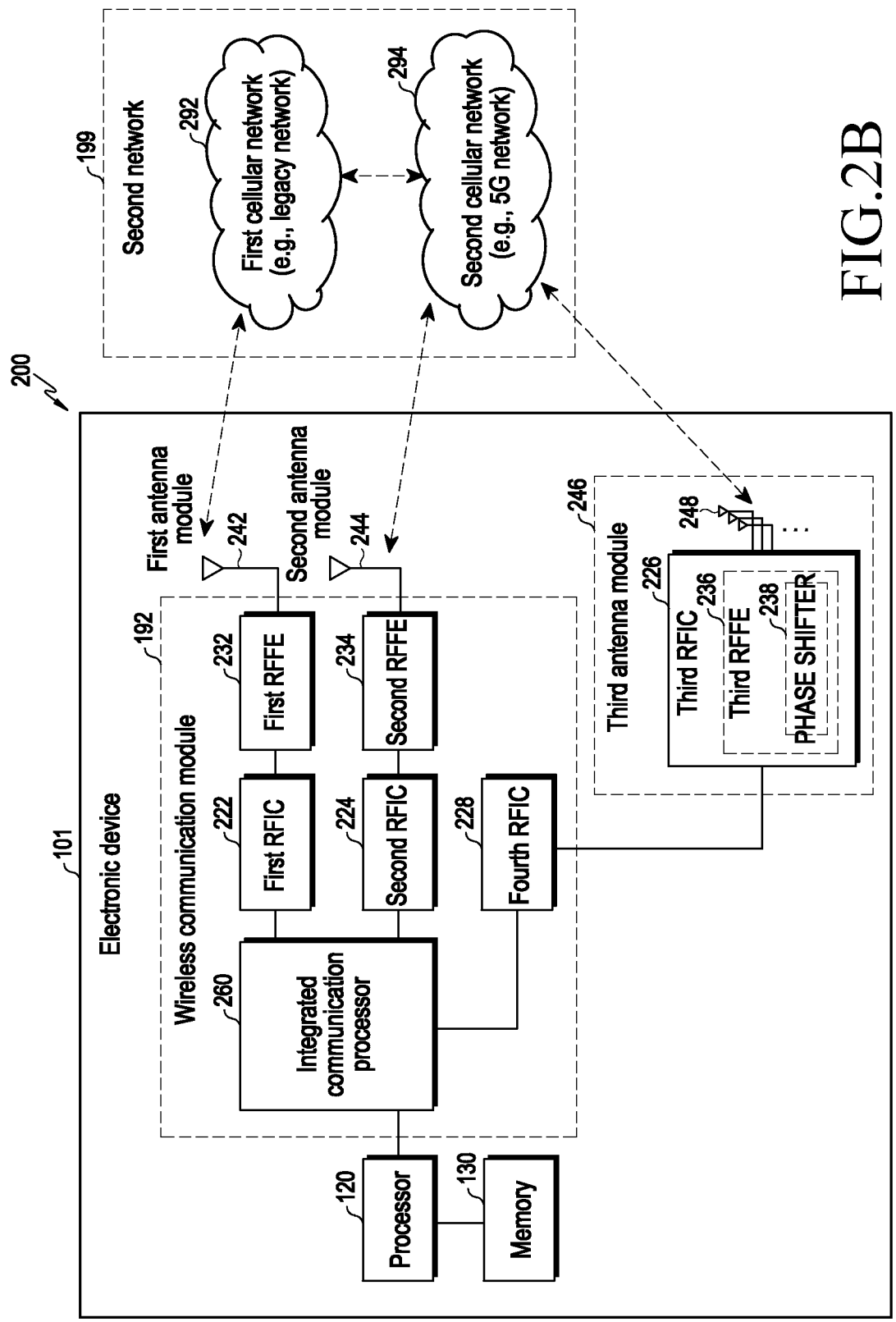
FIG. 2B is a block diagram illustrating an electronic device for supporting legacy network communication and 5G network communication according to various embodiments of the present disclosure.

According to an embodiment, the first communication processor 212 and the second communication processor 214 may be implemented in a single chip or a single package. According to an embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and the second RFFE 234, and the integrated RFIC may convert a baseband signal into a signal of a band supported by the first RFFE 232 and/or the second RFFE 234 and may transmit the converted signal to one of the first RFFE 232 and the second RFFE 234. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., new radio (NR) protocol information) for communication with the 5G network may be stored in the memory 230 and be accessed by other components (e.g., the processor 120, the first communication processor 212, or the second communication processor 214).

Figure 3A:
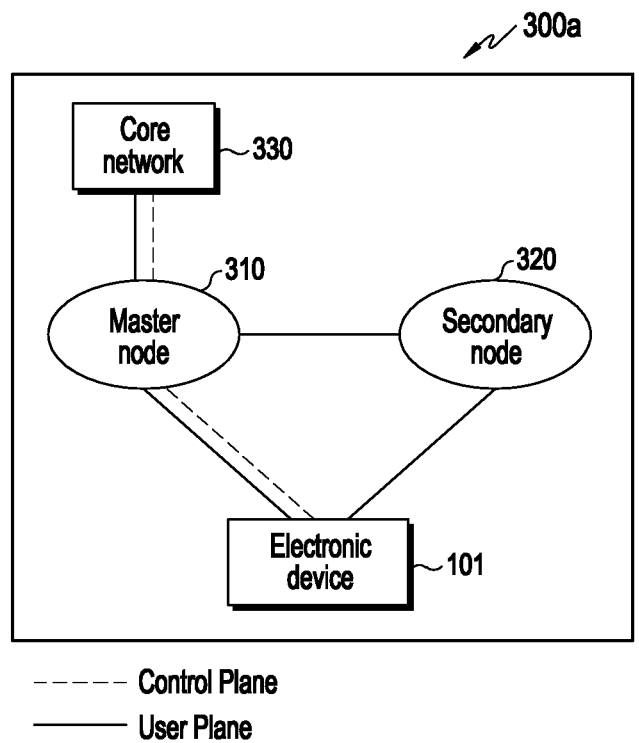
FIG. 3A is a view illustrating wireless communication systems providing a legacy communication network and/or a 5G communication network according to various embodiments of the present disclosure.
Figure 3B:
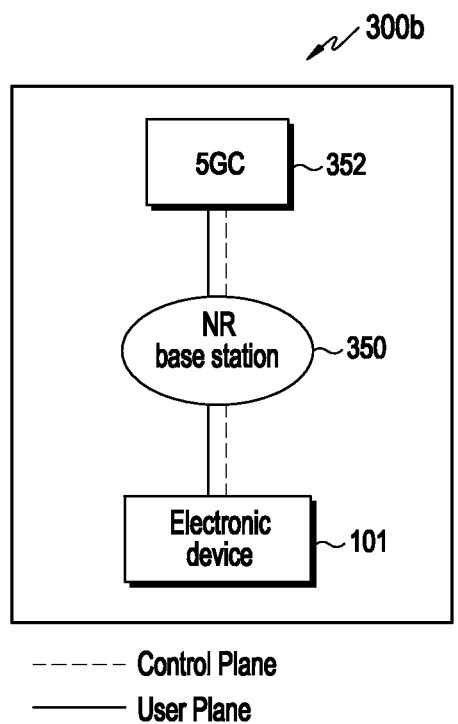
FIG. 3B is a view illustrating wireless communication systems providing a legacy communication network and/or a 5G communication network according to various embodiments of the present disclosure.
Figure 3C:
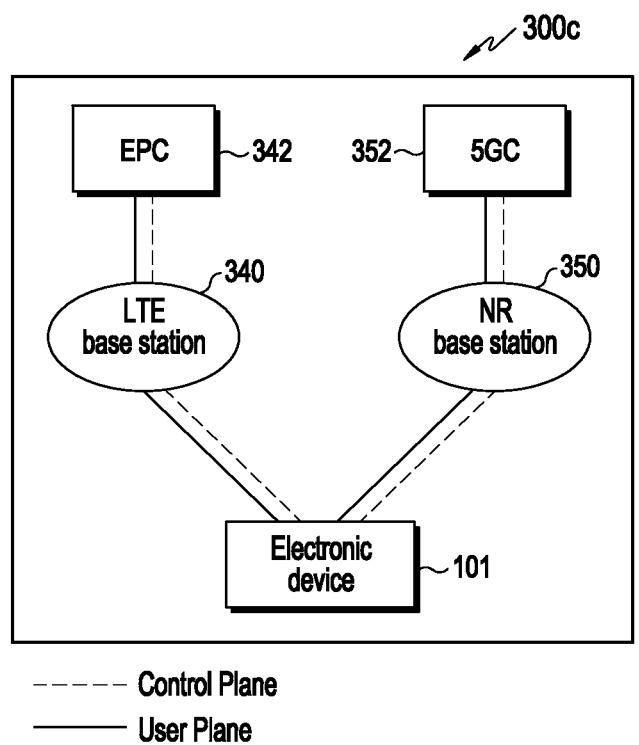
FIG. 3C is a view illustrating wireless communication systems providing a legacy communication network and/or a 5G communication network according to various embodiments of the present disclosure.

FIGS. 3A, 3B, and 3C are views illustrating wireless communication systems providing legacy communication and/or 5G communication networks according to various embodiments of the present disclosure. Referring to FIGS. 3A, 3B, and 3C, the network environment 301a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., a new radio (NR) base station 350 (e.g., a gNodeB (gNB)) that supports radio access with the electronic device 101 and a 5th generation core (5GC) 352 that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments, the network environment 300a may include a network environment that provides wireless communication dual connectivity (DC) to the LTE base station 340 and the NR base station 350 and transmits or receives control messages to/from the electronic device 101 via one core network 230 of the EPC 342 or the 5GC 352.

According to various embodiments, in the DC environment, one of the LTE base station 340 or the NR base station 350 may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to an embodiment, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to an embodiment, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment of the present disclosure, the 5G network may include the NR base station 350 and the 5GC 352 and transmit or receive control messages and user data independently from the electronic device 101.

Referring to FIG. 3C, according to an embodiment of the present disclosure, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments, the electronic device 101 may be registered in at least one of the EPC 342 or the 5GC 352 to transmit or receive control messages.

According to various embodiments, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Hereinafter, a method for controlling connection with a communication network by an electronic device according to various embodiments is described with reference to FIGS. 4 to 12. The methods described below may be performed through the electronic device 101 of FIGS. 1 to 3.

Figure 4:
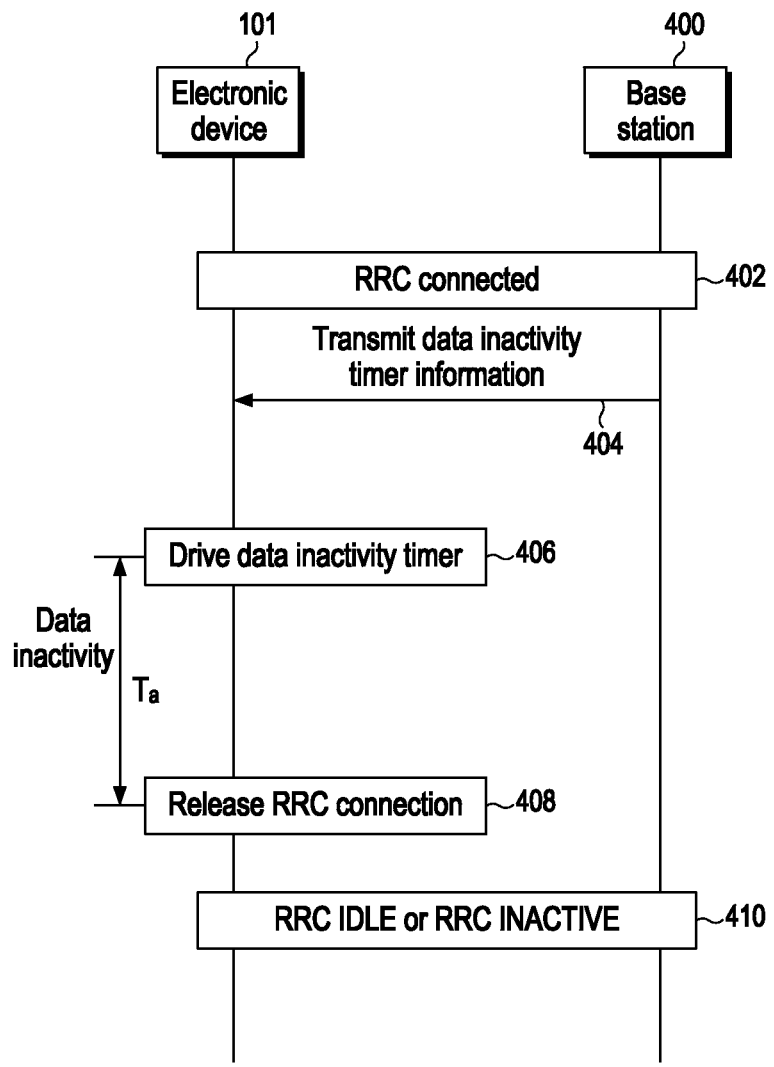
FIG. 4 is a flowchart illustrating an operation for connecting to a communication network by an electronic device according to various embodiments of the present disclosure.

FIG. 4 is a flowchart illustrating an operation for connecting to a communication network by an electronic device according to various embodiments of the present disclosure. Referring to FIG. 4, in operation 402, an electronic device 101 may be radio resource control (RRC) connected with a base station 400 (e.g., the LTE base station 340 or the NR base station 350 of FIG. 3B or 3C) through an RRC configuration procedure. A state in which the electronic device 101 is RRC connected to the base station 400 may be referred to as an RRC connected state, but various embodiments are not limited thereto. According to various embodiments, the RRC configuration procedure may include a message transmission/reception procedure between the electronic device 101 and the base station 400. A detailed example thereof is described below in the description of FIG. 8.

According to various embodiments, the base station 400 may transmit data inactivity timer information to the electronic device 101 in operation 404. For example, the data inactivity timer information may correspond to "dataInactivityTimer" set forth in 3GPP standard specification TS 38.321 or TS 38.331, but is not limited thereto.

According to various embodiments, the electronic device 101 (e.g., the RRC layer of the electronic device 101) may control a data inactivity operation by setting or driving the data inactivity timer based on a first setting value (e.g., Ta) corresponding to the data inactivity timer information received from the base station 400 in operation 406.

According to various embodiments, the electronic device 101 may determine that there is transmission or reception data with the base station 400 when a medium access control (MAC) entity receives or transmits a MAC service data unit (SDU) (e.g., MAC data for at least one logic channel among a dedicated traffic channel (DTCH), a dedicated control channel (DCCH), or a common control channel (CCCH)). When there is transmission or reception data with the base station 400, the electronic device 101 may control to reset or restart the running data inactivity timer.

According to various embodiments, when there is no transmission or reception data with the base station 400 for a time of the first setting value, the electronic device 101 may determine that the data inactivity timer has expired and may perform at least one operation configured for releasing RRC connection in operation 408. For example, the electronic device 101 may perform RRC connection release by performing at least one operation disclosed in 3GPP standard specification TS 38.331. As the RRC connection release is performed, the electronic device 101 may enter an RRC idle state or an RRC inactive state in operation 410.

Figure 5:
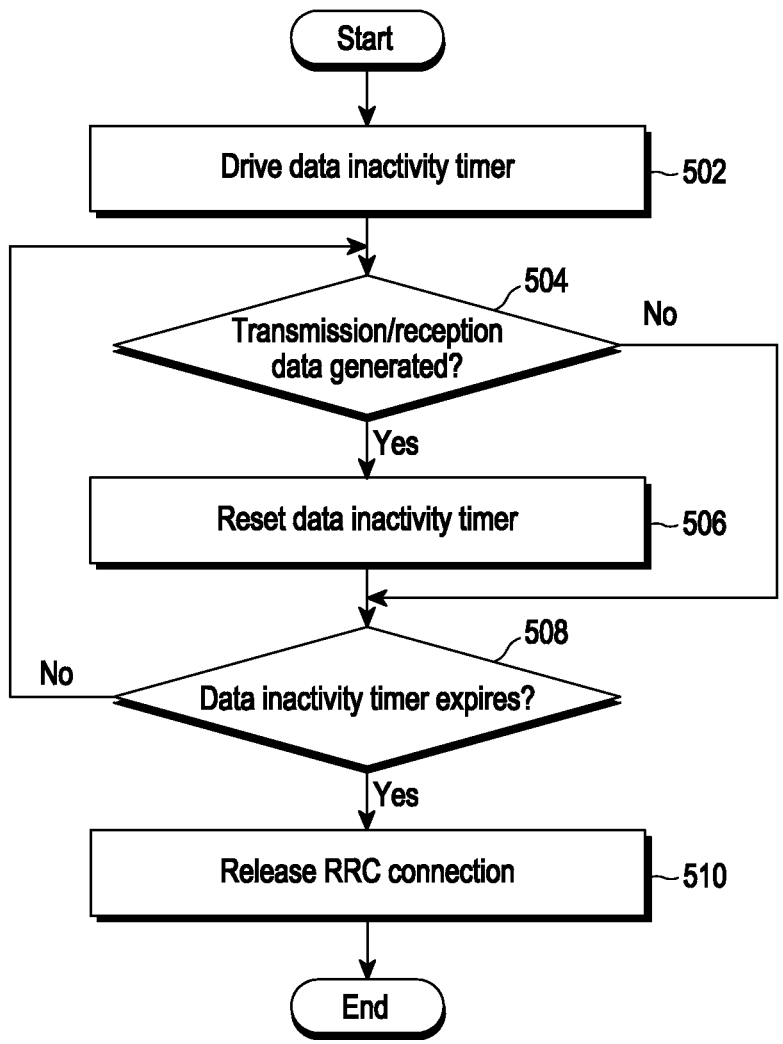
FIG. 5 is a flowchart illustrating an operation for connecting to a communication network by an electronic device according to various embodiments of the present disclosure.

FIG. 5 is a flowchart illustrating an operation for connecting to a communication network by an electronic device according to various embodiments of the present disclosure. Referring to FIG. 5, the electronic device 101 may drive a data inactivity timer in operation 502. The data inactivity timer information for driving the data inactivity timer may be received from the base station 400 as described above with reference to FIG. 4 or may be configured in the electronic device 101.

According to various embodiments, in operation 504, the electronic device 101 may identify whether transmission/reception data is generated. For example, the electronic device 101 may determine that transmission or reception data with the base station 400 has been generated when a medium access control (MAC) entity receives or transmits a MAC service data unit (SDU) (e.g., MAC data for at least one logic channel among a dedicated traffic channel (DTCH), a dedicated control channel (DCCH), or a common control channel (CCCH)).

According to various embodiments, when transmission or reception data with the base station 400 is determined to have been generated (Yes in operation 504), the electronic device 101 may control to reset or restart the running data inactivity timer in operation 506. According to various embodiments, when it is not determined that transmission or reception data with the base station 400 has been generated (No in operation 504), the electronic device 101 may continuously run the data inactivity timer.

According to various embodiments, the electronic device 101 may identify whether the data inactivity timer has expired in operation 508. For example, when it is determined that no transmission or reception data with the base station 400 has been generated during a time set for the set inactivity timer (e.g., the time corresponding to the first setting value (e.g., Ta)), the electronic device 101 may identify that the data inactivity timer has expired. As a result of the identification in operation 508, when it is determined that the data inactivity timer has expired (Yes in operation 508), the electronic device 101 may release the RRC connection. In operation 408, the electronic device 101 may perform at least one operation configured for releasing RRC connection. For example, in operation 510, the electronic device 101 may perform RRC connection release by performing at least one operation disclosed in 3GPP standard specification TS 38.331. As the RRC connection release is performed, the electronic device 101 may enter an RRC idle state or an RRC inactive state. As a result of the identification in operation 508, when it is determined that the data inactivity timer has not expired (No in operation 508), the electronic device 101 may continuously identify whether transmission/reception data is generated in operation 504.

Hereinafter, a radio protocol structure of the electronic device 101 transmitting or receiving data is described with reference to FIGS. 6A, 6B, and 7.

Figure 6A:
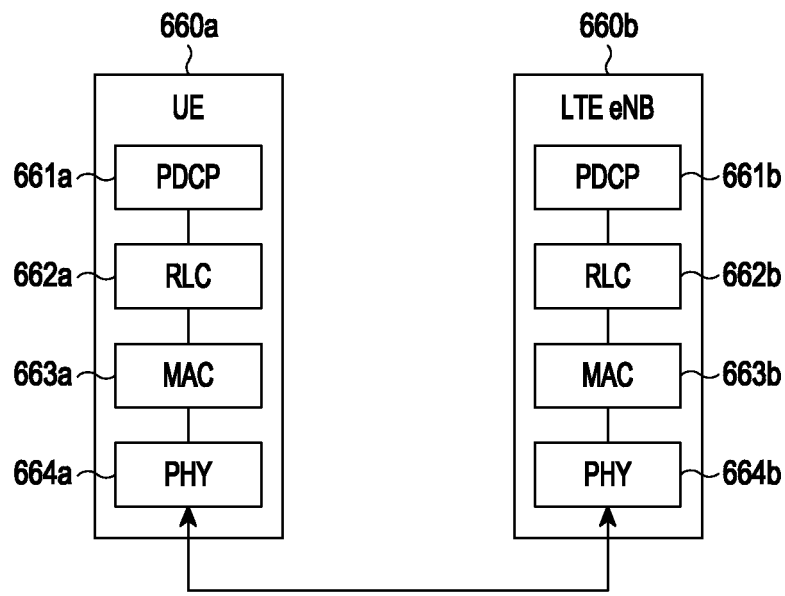
FIG. 6A is a view illustrating a radio protocol structure according to various embodiments of the present disclosure.

FIG. 6A is a view illustrating a radio protocol structure in an LTE system.

Referring to FIG. 6A, according to an embodiment of the present disclosure, an LTE system radio protocol stack may packet data convergence protocol (PDCP) entities 661*a* and 961*b*, radio link control (RLC) entities 662*a* and 662*b*, medium access control (MAC) entities 663*a* and 663*b*, and physical (PHY) entities 664*a* and 664*b* in a UE 660*a* and an LTE eNB 660*b*, respectively.

According to various embodiments, the packet data convergence protocol (PDCP) 661*a* or 661*b* may be in charge of IP header compression/restoration. The major functions of the PDCP may be summarized as follows. According to an embodiment, in an EN-DC environment, NR PDCP may be included in the LTE protocol of the UE and base station to support various EN-DC functions:

Header compression and decompression (ROHC only);
Transfer of user data;
In-sequence delivery of upper layer PDUs at PDCP re-establishment procedure for RLC AM;
For split bearers in DC (only support for RLC AM), PDCP PDU routing for transmission and PDCP PDU reordering for reception;
duplicate detection of lower layer SDUs at PDCP re-establishment procedure for RLC AM;
Retransmission of PDCP SDUs at handover and, for split bearers in DC, of PDCP PDUs at PDCP data-recovery procedure, for RLC AM;
Ciphering and deciphering; and/or
Timer-based SDU discard in uplink.

According to an embodiment, radio link control (hereinafter, "RLC") 662*a* and 662*b* may reconstruct the PDCP packet data unit (PDU) into proper sizes and perform, e.g., ARQ operation. The major functions of the RLC may be summarized as follows:

Transfer of upper layer PDUs;
Error correction through ARQ (only for AM data transfer);
Concatenation, segmentation and reassembly of RLC SDUs (only for UM and AM data transfer);
Re-segmentation of RLC data PDUs (only for AM data transfer);
Reordering of RLC data PDUs (only for UM and AM data transfer);
Duplicate detection (only for UM and AM data transfer);
Protocol error detection (only for AM data transfer);
RLC SDU discard (only for UM and AM data transfer); and/or
RLC re-establishment.

According to various embodiments, the MACs 663*a* and 663*b* are connected with several RLC layer devices configured in one UE and may multiplex the RLC PDUs into a MAC PDU and demultiplex the MAC PDU into RLC PDUs. The major functions of the MAC may be summarized as follows:

Mapping between logical channels and transport channels;
Multiplexing/demultiplexing of MAC SDUs belonging to one or different logical channels into/from transport blocks (TB) delivered to/from the physical layer on transport channels;
Scheduling information reporting;
Error correction through HARQ;
Priority handling between logical channels of one UE;
Priority handling between UEs by means of dynamic scheduling;
MBMS service identification;
Transport format selection; and/or
Padding.

According to an embodiment, the PHYs 664*a* and 664*b* channel-code and modulate higher layer data into OFDM symbols, transmit the OFDM symbols through a wireless channel or demodulates OFDM symbols received through a wireless channel, channel-decodes and transfers the same to a higher layer.

Figure 6B:
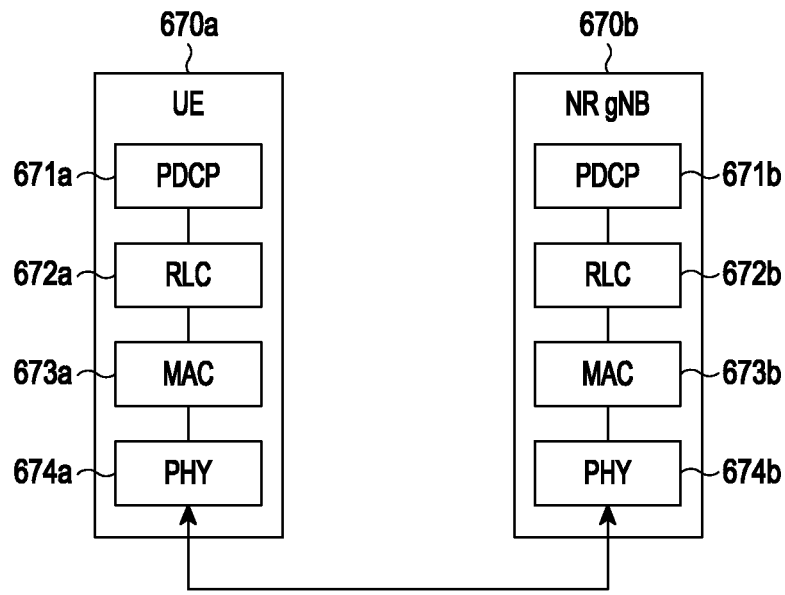
FIG. 6B is a view illustrating a radio protocol structure of a next-generation mobile communication system according to various embodiments of the present disclosure.

FIG. 6B is a view illustrating a radio protocol structure of a next-generation mobile communication system according to various embodiments of the present disclosure.

Referring to FIG. 6B, according to an embodiment, a radio protocol stack of a next-generation mobile communication system may include NR PDCPs 671*a* and 671*b*, NR RLCs 672*a* and 672*b*, NR MACs 673*a* and 673*b*, and NR PHYs 674*a* and 674*b* in a UE 670*a* and an NR base station (gNB) 670*b*, respectively. Although not shown, the radio protocol stack of the next-generation mobile communication system may further include a service data adaptation protocol (SDAP) in each of the UE 670*a* and the NR base station (gNB) 670*b*. The SDAP may manage the allocation of radio bearers based on the quality-of-service (QoS) of user data.

According to an embodiment, the major functions of the NR PDCPs 671*a* and 671*b* may include some of the following ones:

Header compression and decompression (ROHC only);
Transfer of user data;
In-sequence delivery of upper layer PDUs;
PDCP PDU reordering for reception;
Duplicate detection of lower layer SDUs;
Retransmission of PDCP SDUs;
Ciphering and deciphering; and/or
Timer-based SDU discard in uplink.

According to an embodiment, the reordering by the NR PDCP refers to reordering PDCP PDUs received by the lower layer based on the PDCP sequence numbers (SNs) and may include transferring the data to the higher layer in the order reordered, recording PDCP PDUs missed by reordering, reporting the state of the missing PDCP PDUs to the transmit part, and requesting to retransmit the missing PDCP PDUs.

According to an embodiment, the major functions of the NR RLCs 672*a* and 672*b* may include some of the following ones:

Transfer of upper layer PDUs;
In-sequence delivery of upper layer PDUs;
Out-of-sequence delivery of upper layer PDUs;
Error correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and/or
RLC re-establishment.

According to an embodiment, the in-sequence delivery by the NR RLC refers to transferring the RLC SDUs received from the lower layer to the higher layer in order and, if one original RLC SDU is split into several RLC SDUs that are then received, the in-sequence delivery may include reassembling and transferring them, reordering the received RLC PDUs based on the RLC SNs or PDCP SNs, recording the RLC PDUs missed by reordering, reporting the state of the missing RLC PDUs to the transmit part, and requesting to retransmit the missing RLC PDUs and, if there are missing RLC SDUs, the in-sequence delivery may include transferring only RLC SDUs before the missing RLC SDUs to the higher layer in order.

Although there are missing RLC SDUs, if a predetermined timer has expired, the in-sequence delivery may include transferring all of the RLC SDUs received before the timer starts to the higher layer in order. Or, although there are missing RLC SDUs, if the predetermined timer has expired, the in-sequence delivery may include transferring all of the RLC SDUs received thus far to the higher layer in order. The out-of-sequence delivery by the NR RLC refers to immediately transferring the RLC SDUs received from the lower layer to the higher layer regardless of order and, if one original RLC SDU is split into several RLC SDUs that are then received, the out-of-sequence delivery may include reassembling and transferring them and storing the RLC SNs or PDCP SNs of the received RLC PDUs, ordering them, and recording missing RLC PDUs.

According to an embodiment, the NR MACs 673a and 673b may be connected to several NR RLC layers configured in one UE, and the major functions of the NR MAC may include some of the following functions:

Mapping between logical channels and transport channels;
Multiplexing/demultiplexing of MAC SDUs;
Scheduling information reporting;
Error correction through HARQ;
Priority handling between logical channels of one UE;
Priority handling between UEs by means of dynamic scheduling;
MBMS service identification;
Transport format selection; and/or
Padding.

According to an embodiment, the NR PHYs 674a and 674b channel-code and modulate higher layer data into OFDM symbols, transmit the OFDM symbols through a wireless channel or demodulates OFDM symbols received through a wireless channel, channel-decodes and transfers the same to a higher layer.

According to an embodiment, information that may be included in the MAC header is described below with reference to Table 1.

TABLE 1

| Variables | Purposes |
|---|---|
| LCID | LCID may refer to the identifier of the RLC entity that has generated the RLC PDU (or MAC SDU) received from the higher layer. Or LCID may refer to the MAC control element (CE) or padding. For this, different definitions may be made depending on channels. For example, different definitions may be made depending on the DL-SCH, UL-SCH, and MCH. |
| L | This refers to the length of MAC SDU and may denote the length of MAC CE which varies in length. For MAC CEs with a fixed length, the L-field may be omitted. For some reasons, the L-field may be left out. The reasons may include when the size of MAC SDU is fixed, when the transmit part notifies the receive part of the size of MAC PDU, or when the length may be calculated on the receive part. |
| F | This refers to the size of the L-field. Absent the L-field, this may be omitted and, if the F-field exists, the size of the L-field may be limited to a predetermined size. |
| F2 | This refers to the size of the L-field. Absent the L-field, this may be omitted and, if the F2-field exists, the size of the L-field may be limited to a size different than the size of the F-field. For example, the F2-field may indicate a size larger than the F-field. |
| E | This refers to whether the MAC header includes other headers. For example, if this indicates 1, variables of another MAC header may come thereafter. However, if it is 0, it may be followed by the MAC SDU, MAC CE, or padding. |
| R | This is a reserved bit. |

Figure 7:
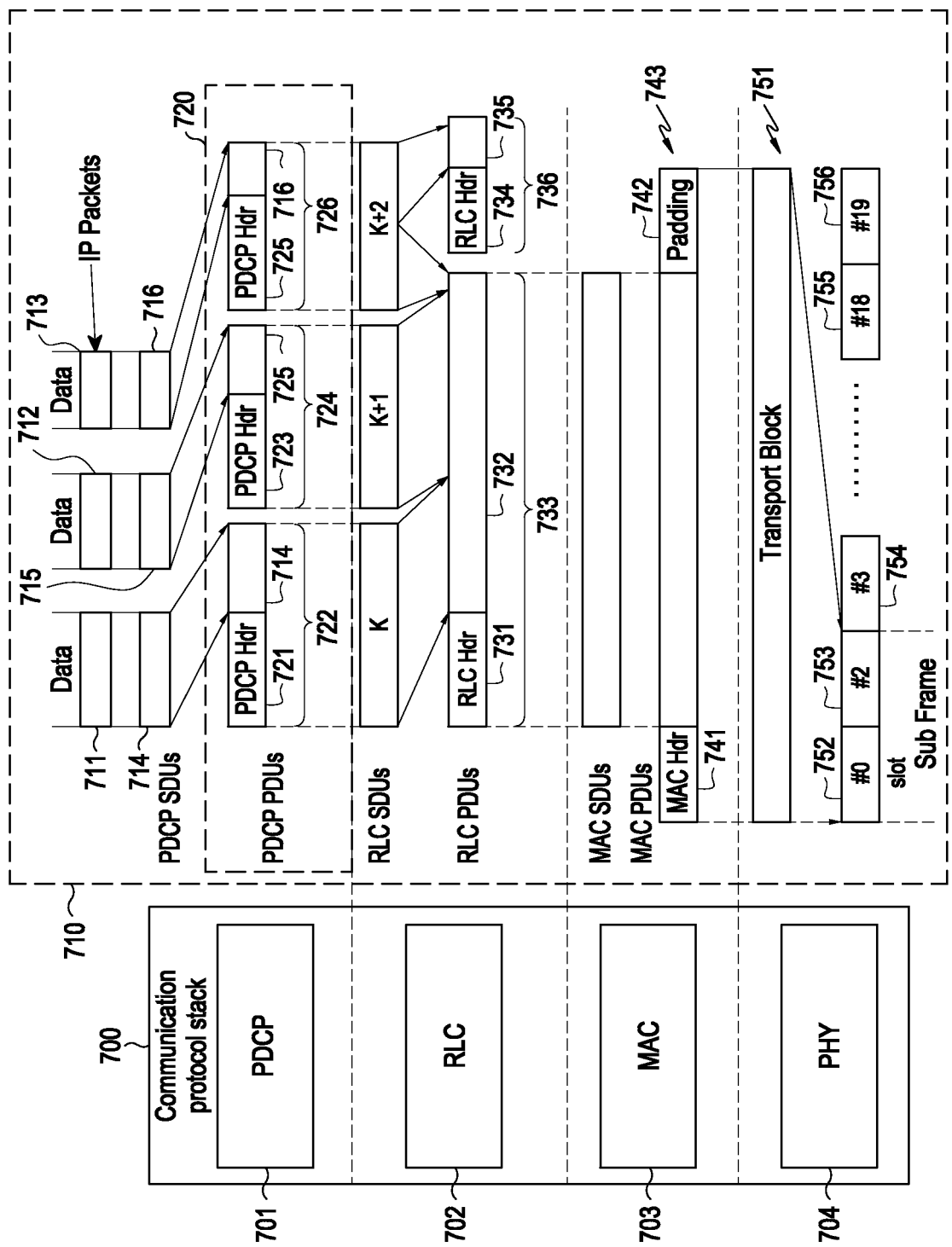
FIG. 7 is a view illustrating a data change between network layers.

Referring to FIG. 7, according to an embodiment of the present disclosure, a communication protocol stack 700 of an electronic device (e.g., the electronic device 101) may include a PDCP entity 701, an RLC entity 702, a MAC entity 703, and a PHY entity 704. The PDCP entity 701, the RLC entity 702, the MAC entity 703, and the PHY entity 704 may be entities based on the radio protocol of LTE system or entities based on the radio protocol of NR system.

For example, if the electronic device transmits/receives data based on LTE, the PDCP entity 701, RLC entity 702, MAC entity 703, and PHY entity 704 based on the radio protocol of LTE system may be configured. For example, if the electronic device transmits/receives data based on NR, the PDCP entity 701, RLC entity 702, MAC entity 703, and PHY entity 704 based on the radio protocol of NR system may be configured. For example, as illustrated in FIG. 7, packet data processed based on the PDCP entity 701, RLC entity 702, MAC entity 703, and PHY entity 704 (e.g., physical layer) may be stored at least temporarily in some logical area or some physical area of the memory 710 (e.g., the volatile memory 132 of FIG. 1 or a memory in the communication processor 212, 214, or 260) of the electronic device.

According to an embodiment, the PDCP entity 701 may further include PDCP headers 721, 723, and 725 in PDCP SDUs 714, 715, and 716 which are based on data 711, 712, and 713 which are internet protocol (IP) packets and may transfer PDCP PDUs 722, 724, and 726. The PDCP header information transferred by the LTE PDCP entity may differ from the PDCP header information transferred by the NR PDCP entity. According to an embodiment, the PDCP buffer 720 may be implemented in a designated logical area or physical area inside the memory 710. The PDCP buffer 720 may receive the PDCP SDUs 714, 715, and 716 based on the PDCP entity 701 and, at least temporarily, store them, and the PDCP buffer 720 may further include the PDCP headers 721, 723, and 725 in the PDCP SDUs 714, 715, and 716 and transfer the PDCP PDUs 722, 724, and 726 to the RLC layer.

According to an embodiment, the RLC entity 702 may add the RLC headers 731 and 734 to the first data 732 and second data 735, respectively, which have been obtained by reconstructing the RLC SDUs 722 (e.g., PDCP PDU is converted to RLC SDU under a network layering architec- According to various embodiments, the base station 400 may transmit an RRC reconfiguration message to the electronic device 101 in operation 808. The RRC reconfiguration message may include data inactivity timer information. The RRC reconfiguration message including the data inactivity timer information may be configured as shown in Table 2 below.

TABLE 2

```
-- ASN1START
-- TAG-MAC-CELLGROUPCONFIG-START
MAC-CellGroupConfig ::= SEQUENCE {
    drx-Config SetupRelease { DRX-Config } OPTIONAL, -- Need M
    schedulingRequestConfig SchedulingRequestConfig OPTIONAL, -- Need M
    bsr-Config BSR-Config OPTIONAL, -- Need M
    tag-Config TAG-Config OPTIONAL, -- Need M
    phr-Config SetupRelease { PHR-Config } OPTIONAL, -- Need M
    skipUplinkTxDynamic BOOLEAN,
    ...,
    [[
    csi-Mask BOOLEAN OPTIONAL, -- Need M
    dataInactivityTimer SetupRelease { DataInactivityTimer } OPTIONAL --
Cond MCG-Only
    ]],
    [[
    usePreBSR-r16 ENUMERATED {true} OPTIONAL, -- Need R
    schedulingRequestID-LBT-SCell-r16 SchedulingRequestId OPTIONAL, --
Need R
    lch-BasedPrioritization-r16 ENUMERATED {enabled} OPTIONAL, -- Need
R
    schedulingRequestID-BFR-SCell-r16 SchedulingRequestId OPTIONAL, --
Need R
    drx-ConfigSecondaryGroup-r16   SetupRelease   {   DRX-
ConfigSecondaryGroup } OPTIONAL -- Need M
    ]]
}
DataInactivityTimer ::= ENUMERATED {s1, s2, s3, s5, s7, s10, s15, s20, s40,
s50, s60, s80, s100, s120, s150, s180}
-- TAG-MAC-CELLGROUPCONFIG-STOP
-- ASN1STOP
``` ture), 724, and 726 and may transfer the RLC PDUs 733 and 736 (e.g., RLC PDU is converted to MAC SDU under a network layering architecture). The LTE-based RLC header information may differ from the NR-based RLC header information. According to an embodiment, the MAC entity 702 may add the MAC header 741 and padding 742 to, e.g., the MAC SDU 733 and transfer the MAC PDU 743 which, as the transport block 751, may be processed in the physical layer 704. The transport block 751 may be processed as slots 752, 753, 754, 755, and 756. According to an embodiment, although not shown in FIG. 7, the memory 710 may include a buffer corresponding to each of the RLC layer and the MAC layer.

Figure 8:
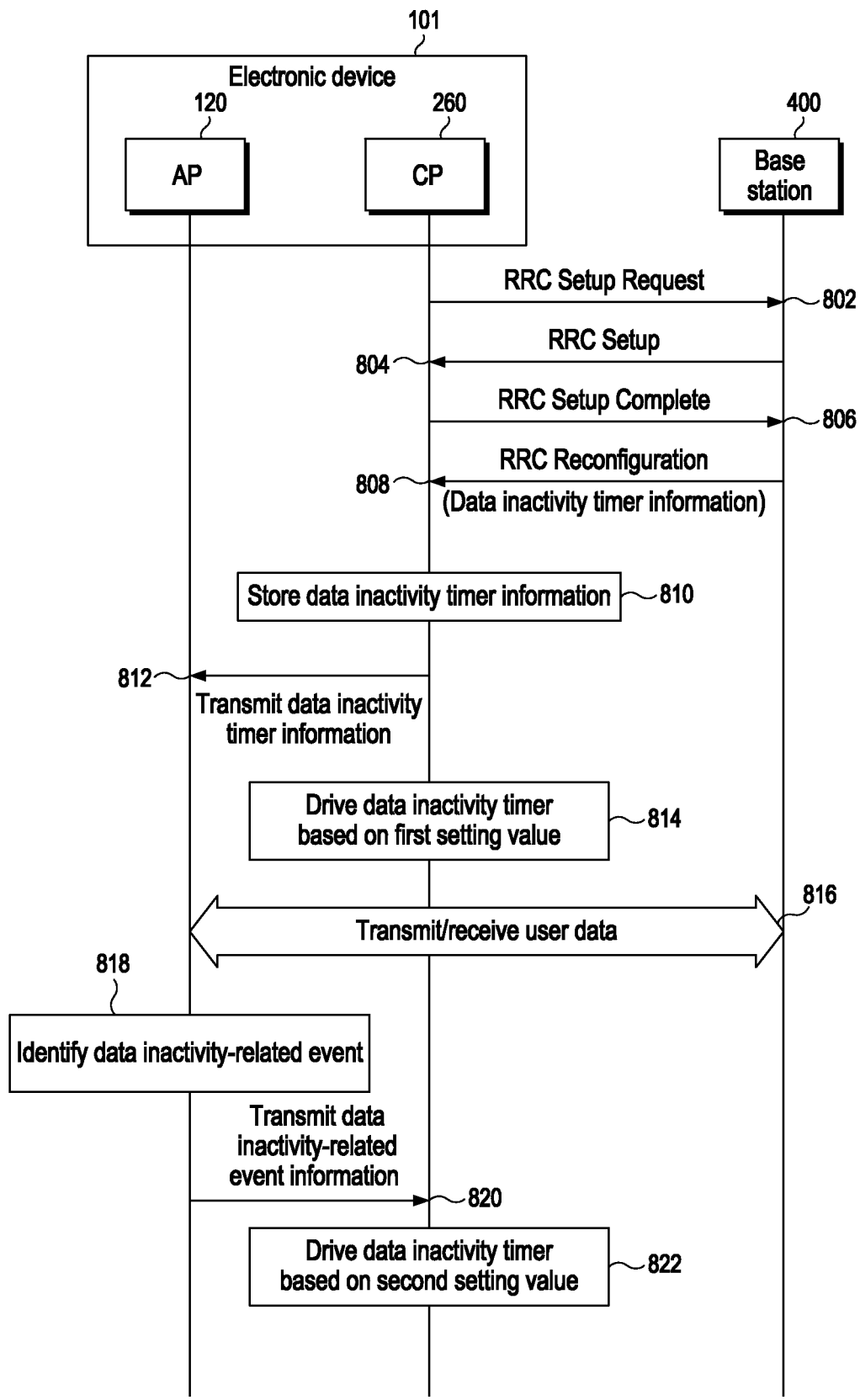
FIG. 8 is a flowchart illustrating an operation for connecting to a communication network by an electronic device according to various embodiments of the present disclosure.

FIG. 8 is a flowchart illustrating an operation for connecting to a communication network by an electronic device according to various embodiments of the present disclosure. Referring to FIG. 8, the communication processor CP 260 of the electronic device 101 may transmit an RRC setup request message to the base station 400 in operation 802. The base station 400 may transmit an RRC setup message to the electronic device 101 in operation 804. The CP 260 of the electronic device 101 may receive the RRC setup message transmitted from the base station 400 and may send an RRC setup complete message to the base station 400 in operation 806. As the electronic device 101 transmits an RRC setup complete message to the base station 400, the electronic device 101 may become an RRC connected state. For example, the RRC setup complete message may include a network registration request.

Referring to Table 2, the data inactivity timer information may be expressed as "dataInactivityTimer," and a setting value (e.g., the first setting value) may be set in seconds and transmitted. For example, the first setting value corresponding to the data inactivity timer information may be set to any one value among 1 second (s1), 2 seconds (s2), 3 seconds (s3), 5 seconds (s5), 7 seconds (s7), 10 seconds (s10), 15 seconds (s15), 20 seconds (s20), 40 seconds (s40), 50 seconds (s50), 60 seconds (s60), 80 seconds (s80), 100 seconds (s100), 120 seconds (s120), 150 seconds (s150), and 180 seconds (s180).

According to various embodiments, the CP 260 of the electronic device 101 may store the data inactivity timer information included in the RRC reconfiguration message transmitted from the base station 400 in operation 810. The CP 260 of the electronic device 101 may transmit the data inactivity timer information to the application processor (AP) 120 in operation 812.

According to various embodiments, in operation 814, the CP 260 of the electronic device 101 may drive the data inactivity timer based on the first setting value corresponding to the data inactivity timer information received from the base station 400. For example, the CP 260 of the electronic device 101 may identify that the data inactivity timer has expired when there is no transmission or reception data with the base station 400 during the first setting value. For example, when the CP 260 of the electronic device 101 drives the data inactivity timer and there is no transmission or reception data with the base station 400 until the first setting value is reached, it may be identified that the data inactivity timer is activated. According to various embodiments, as illustrated in FIG. 5, when transmission or reception data with the base station 400 is generated or exists before the data inactivity timer expires, the running data inactivity timer may be controlled to be reset or restarted.

According to various embodiments, the electronic device 101 may determine that transmission or reception data with the base station 400 is generated or exists when a medium access control (MAC) entity 703 described above in connection with FIG. 7 receives or transmits a MAC service data unit (SDU) (e.g., MAC data for at least one logic channel among a dedicated traffic channel (DTCH), a dedicated control channel (DCCH), or a common control channel (CCCH)). When there is transmission or reception data with the base station 400, the electronic device 101 may control to reset or restart the running data inactivity timer. For example, in operation 816, the electronic device 101 may transmit/receive user data to/from the base station 400, and the data inactivity timer may be reset or restarted when transmitting and receiving the user data.

According to various embodiments, the AP 120 of the electronic device 101 may identify a data inactivity-related event in operation 818. For example, the data inactivity-related event may include at least one of a display off event, an end event of an application using data, and an end event of a session using data.

According to various embodiments, the AP 120 of the electronic device 101 may transmit data inactivity-related event information (e.g., an event indicator) to the CP 260 in operation 820. The CP 260 may identify a set second setting value based on the data inactivity-related event information received from the AP 120 and, in operation 822, may drive the data inactivity timer based on the second setting value. For example, if receiving the data inactivity-related event from the AP 120 while driving the data inactivity timer based on the first setting value, the CP 260 may change the first setting value into a second setting value set corresponding to the data inactivity-related event and drive the data inactivity timer based on the changed second setting value.

According to various embodiments, the second setting value may be set to a smaller constant value than the first setting value. For example, when the first setting value corresponding to the data inactivity timer information received from the base station 400 is 5 seconds, the second setting value may be set to 3 seconds.

According to various embodiments, in operation 820 of FIG. 8, the AP 120 transmits data inactivity-related event information to the CP 260. However, according to another embodiment, the AP 120 may identify the second setting value set corresponding to the data inactivity event information and transmit the identified second setting value to the CP 260. The CP 260 may receive the second setting value from the AP 120 and may drive the data inactivity timer based on the received second setting value.

According to various embodiments, in FIG. 8, the first setting value corresponding to the data inactivity timer information is exemplified as received from the base station 400. However, when the first setting value is not received from the base station 400, it may be generated and applied by the electronic device 101 itself. For example, when the electronic device 101 does not receive the first setting value from the base station 400, the electronic device 101 may generate a first setting value or a second setting value previously stored in the memory (e.g., the memory 130 of FIG. 1) (e.g., latest stored or set) of the electronic device 101, as the first setting value or the second setting value and apply it.

Figure 9:
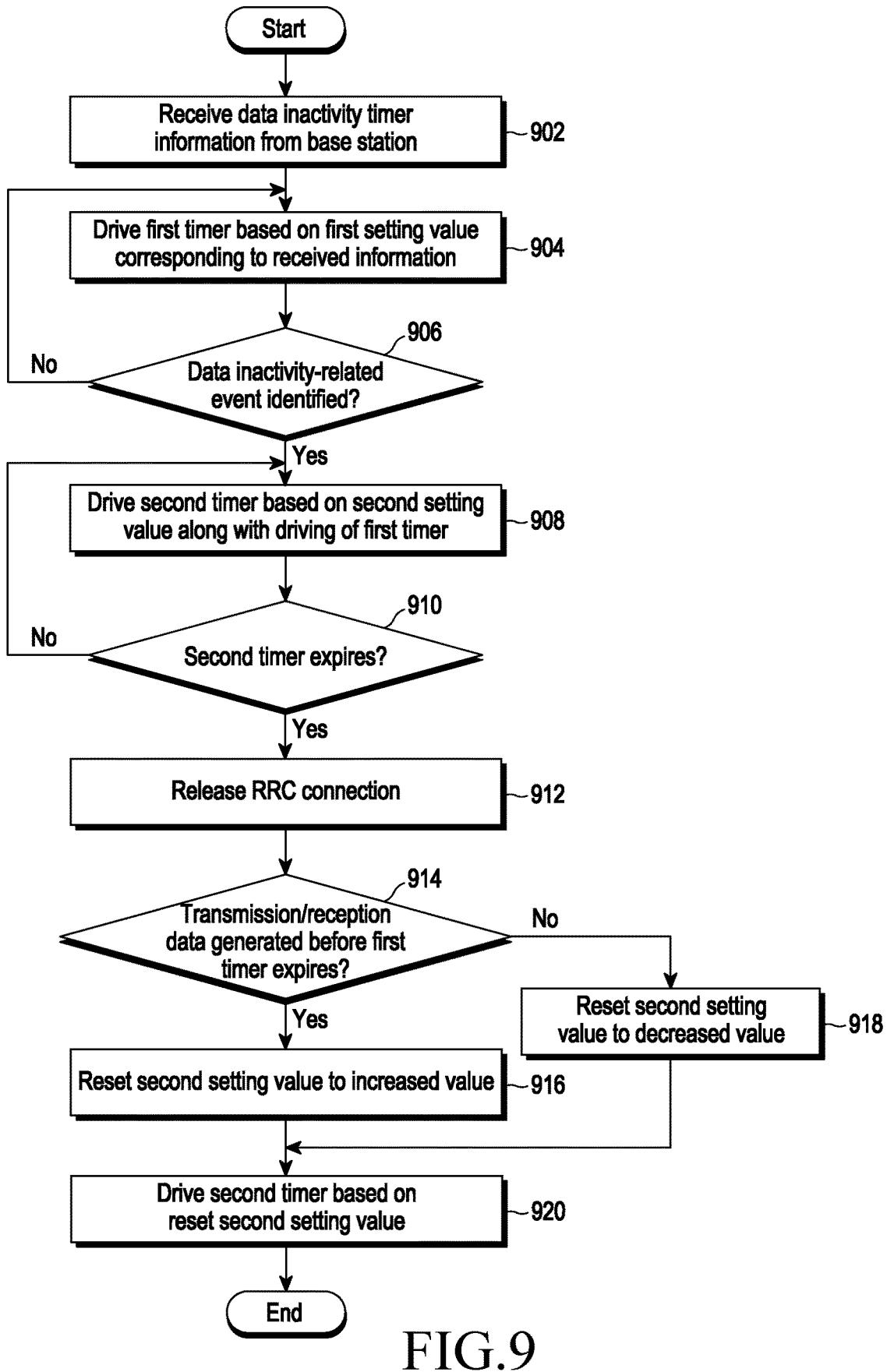
FIG. 9 is a flowchart illustrating an operation for connecting to a communication network by an electronic device according to various embodiments of the present disclosure.

FIG. 9 is a flowchart illustrating an operation for connecting to a communication network by an electronic device according to various embodiments of the present disclosure. Referring to FIG. 9, according to various embodiments, the electronic device 101 (e.g., the CP 260 of the electronic device 101) may receive data inactivity timer information through an RRC reconfiguration message transmitted from the base station 400 in operation 902.

According to various embodiments, in operation 904, the electronic device 101 may drive the data inactivity timer based on the first setting value corresponding to the data inactivity timer information received from the base station 400.

According to various embodiments, the electronic device 101 (e.g., the AP 120 of the electronic device 101) may identify a data inactivity-related event in operation 906. For example, the data inactivity-related event may include at least one of a display off event, an end event of an application using data, and an end event of a session using data.

According to various embodiments, the electronic device 101 (e.g., the CP 260 of the electronic device 101) may drive a second timer based on the second setting value together with the driving of the first timer in operation 908. The second setting value may be set to a smaller value than the first setting value. As the second setting value is set to a value smaller than the first setting value, the second timer based on the second setting value may expire earlier than the first timer based on the first setting value. According to various embodiments, the second setting value may be set to a changeable variable using a constant value smaller than the first setting value as an initial value. According to various embodiments, the second setting value is a changeable variable, and a minimum unit time value (e.g., 1 second) may be set as the minimum value and the first setting value may be set as the maximum value.

According to various embodiments, the electronic device 101 may identify whether the second timer expires in operation 910. As a result of the identification, if the second timer does not expire (No in operation 910), the electronic device 101 may keep running the first timer and the second timer in operation 908. As a result of the identification, when the second timer expires (Yes in operation 910), the electronic device 101 may perform at least one operation configured to release the RRC connection in operation 912. For example, in operation 912, the electronic device 101 may perform RRC connection release by performing at least one operation disclosed in 3GPP standard document TS 38.331 5.3.11. As the RRC connection release is performed, the electronic device 101 may enter an RRC idle state or an RRC inactive state.

According to various embodiments, the electronic device 101 may identify whether transmission/reception data with the base station 400 is generated after the second timer expires and before the first timer expires in operation 914. As a result of the identification, if transmission/reception data with the base station 400 is generated before the first timer expires (Yes in operation 914), the electronic device 101 may reset the second setting value to a value increased by a set value (e.g., 10 ms, 100 ms, or 1 second) in operation 916. As a result of the identification, when transmission/reception data with the base station 400 is not generated before the first timer expires (No in operation 914), the electronic device 101 may reset the second setting value to a value decreased by a set value in operation 918.

According to various embodiments, the initial value of the second setting value may be set to ½ of the first setting value. In operation 914, if transmission/reception data is generated before the expiration of the first timer and after the expiration of the second timer, the second setting value may be reset to double the initial value. In operation 914, if transmission/reception data is not generated before the expiration of the first timer and after the expiration of the second timer, the second setting value may be reset from the initial value to ½ of the initial value. The second setting value may be decreased to the minimum value or increased to the maximum value according to the reset.

According to various embodiments, the electronic device 101 may apply the changed second setting value when identifying the data inactivity-related event in the RRC connected state. For example, the electronic device 101 may drive the second timer based on the reset second setting value in operation 920.

According to various embodiments, in FIG. 9, the first setting value corresponding to the data inactivity timer information is exemplified as received from the base station 400. However, when the first setting value is not received from the base station 400, it may be generated and applied by the electronic device 101 itself. For example, when the electronic device 101 does not receive the first setting value from the base station 400, the electronic device 101 may generate a first setting value or a second setting value previously stored in the memory (e.g., the memory 130 of FIG. 1) (e.g., latest stored or set) of the electronic device 101, as the first setting value or the second setting value and apply it.

Figure 10:
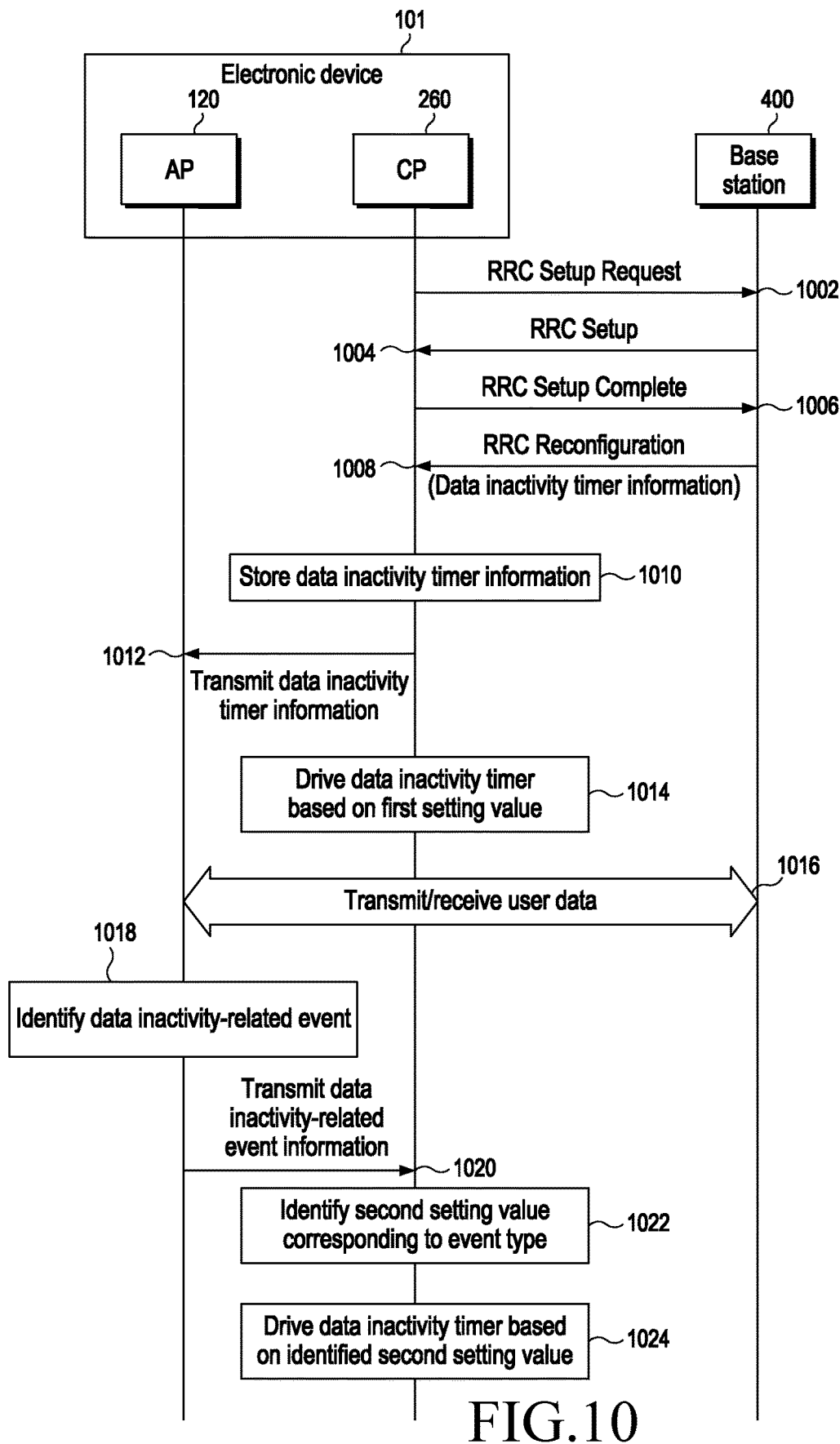
FIG. 10 is a flowchart illustrating an operation for connecting to a communication network by an electronic device according to various embodiments of the present disclosure.

FIG. 10 is a flowchart illustrating an operation for connecting to a communication network by an electronic device according to various embodiments of the present disclosure. Referring to FIG. 10, the communication processor CP 260 of the electronic device 101 may transmit an RRC setup request message to the base station 400 in operation 1002. The base station 400 may transmit an RRC setup message to the electronic device 101 in operation 1004. The CP 260 of the electronic device 101 may receive the RRC setup message transmitted from the base station 400 and may send an RRC setup complete message to the base station 400 in operation 1006. As the electronic device 101 transmits an RRC setup complete message to the base station 400, the electronic device 101 may become an RRC connected state. For example, the RRC setup complete message may include a network registration request.

According to various embodiments, the base station 400 may transmit an RRC reconfiguration message to the electronic device 101 in operation 1008. The RRC reconfiguration message may include data inactivity timer information. The RRC reconfiguration message including the data inactivity timer information may be configured as shown in Table 2 above. For example, the first setting value corresponding to the data inactivity timer information may be set to any one value among 1 second (s1), 2 seconds (s2), 3 seconds (s3), 5 seconds (s5), 7 seconds (s7), 10 seconds (s10), 15 seconds (s15), 20 seconds (s20), 40 seconds (s40), 50 seconds (s50), 60 seconds (s60), 80 seconds (s80), 100 seconds (s100), 120 seconds (s120), 150 seconds (s150), and 180 seconds (s180).

According to various embodiments, the CP 260 of the electronic device 101 may store the data inactivity timer information included in the RRC reconfiguration message transmitted from the base station 400 in operation 1010. The CP 260 of the electronic device 101 may transmit the data inactivity timer information to the application processor (AP) 120 in operation 1012.

According to various embodiments, in operation 1014, the CP 260 of the electronic device 101 may drive the data inactivity timer based on the first setting value corresponding to the data inactivity timer information received from the base station 400. For example, the CP 260 of the electronic device 101 may identify that the data inactivity timer has expired when there is no transmission or reception data with the base station 400 during the first setting value. For example, when the CP 260 of the electronic device 101 drives the data inactivity timer and there is no transmission or reception data with the base station 400 until the first setting value is reached, it may be identified that the data inactivity timer is activated. According to various embodiments, as illustrated in FIG. 5, when transmission or reception data with the base station 400 is generated or exists before the data inactivity timer expires, the running data inactivity timer may be controlled to be reset or restarted.

According to various embodiments, the electronic device 101 may determine that transmission or reception data with the base station 400 is generated or exists when a medium access control (MAC) entity 703 described above in connection with FIG. 7 receives or transmits a MAC service data unit (SDU) (e.g., MAC data for at least one logic channel among a dedicated traffic channel (DTCH), a dedicated control channel (DCCH), or a common control channel (CCCH)). When there is transmission or reception data with the base station 400, the electronic device 101 may control to reset or restart the running data inactivity timer. For example, in operation 816, the electronic device 101 may transmit/receive user data to/from the base station 400, and the data inactivity timer may be reset or restarted when transmitting and receiving the user data.

According to various embodiments, the AP 120 of the electronic device 101 may identify a data inactivity-related event in operation 1018. For example, the data inactivity-related event may include at least one of a display off event, an end event of an application using data, and an end event of a session using data.

According to various embodiments, the AP 120 of the electronic device 101 may transmit data inactivity-related event information (e.g., an event indicator) to the CP 260 in operation 1020. The CP 260 may identify the data inactivity-related event information received from the AP 120 and, in operation 1022, identify the second setting value corresponding to the event type. For example, a plurality of second setting values may be set to different values depending on the types of a plurality of events related to the data inactivity. According to various embodiments, at least some of the plurality of second setting values may be set to the same value. When at least one second setting value among the plurality of second setting values is set to the same value as the first setting value, the subsequent operations may be rendered to be continuously performed depending on the first setting value.

According to various embodiments, as the type of the data inactivity-related event type has a higher chance of data transmission/reception, the electronic device 101 may set the timer to be relatively short. For example, when the type of the data inactivity-related event is a display off event, the second setting value may be set to 1 second, when the type of the data inactivity-related event is an end event of an application using data, the second setting value may be set to 2 seconds, and when the type of the data inactivity-related event is an end event of a session using data, the second setting value may be set to 3 seconds.

According to various embodiments, in operation 1024, the CP 260 of the electronic device 101 may drive the data inactivity timer based on the second setting value. For example, if receiving the data inactivity-related event from the AP 120 while driving the data inactivity timer based on the first setting value, the CP 260 may change the first setting value into a second setting value set corresponding to the data inactivity-related event and drive the data inactivity timer based on the changed second setting value.

According to various embodiments, the second setting value may be set to a smaller constant value than the first setting value. For example, when the first setting value corresponding to the data inactivity timer information received from the base station 400 is 5 seconds, the second setting value may be set to 3 seconds.

According to various embodiments, in operation 820 of FIG. 8, the AP 120 transmits data inactivity-related event information to the CP 260. However, according to another embodiment, the AP 120 may identify the second setting value set according to the type of the data inactivity event information and transmit the identified second setting value to the CP 260. The CP 260 may receive the second setting value from the AP 120 and may drive the data inactivity timer based on the received second setting value.

According to various embodiments, in FIG. 10, the first setting value corresponding to the data inactivity timer information is exemplified as received from the base station 400. However, when the first setting value is not received from the base station 400, it may be generated and applied by the electronic device 101 itself.

Figure 11:
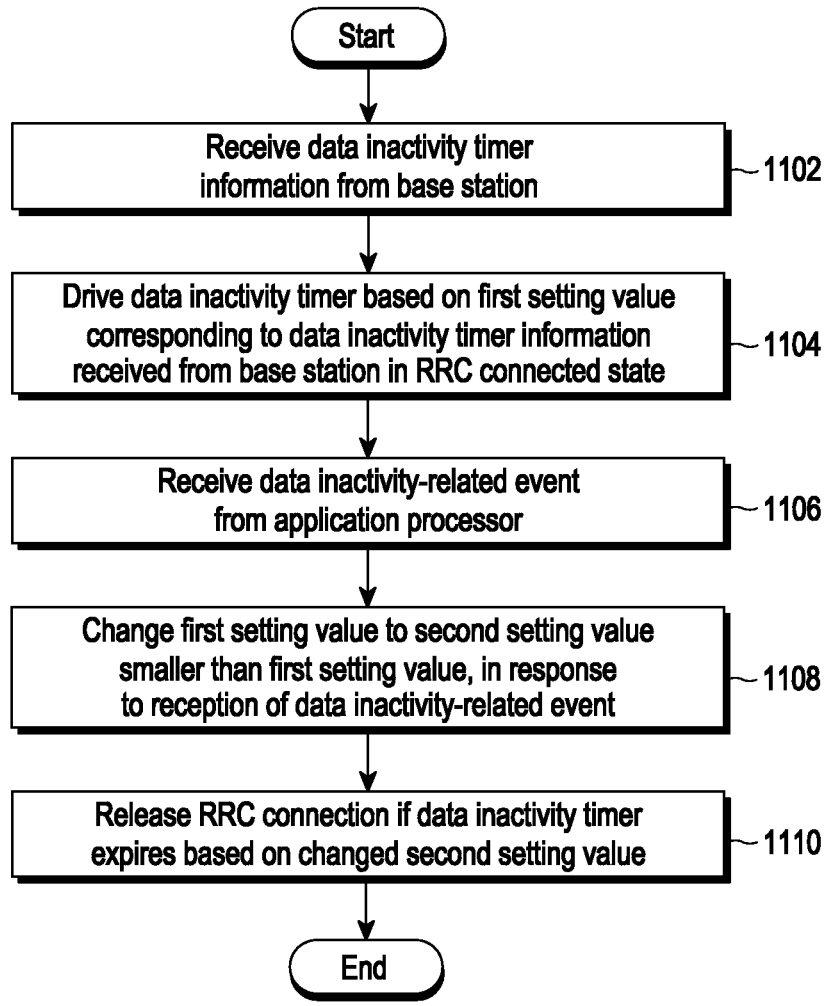
FIG. 11 is a flowchart illustrating an operation for connecting to a communication network by an electronic device according to various embodiments of the present disclosure.

FIG. 11 is a flowchart illustrating an operation for connecting to a communication network by an electronic device according to various embodiments of the present disclosure. Referring to FIG. 11, in operation 1102, the electronic device 101 may receive data inactivity timer ("DataInactivity-Timer") information from the base station.

According to various embodiments, in operation 1104, the electronic device 101 may drive the data inactivity timer based on the first setting value corresponding to the received data inactivity timer information in the RRC connected state for the base station 400.

According to various embodiments, the communication processor (CP) 260 of the electronic device 101 may receive a data inactivity-related event from the application processor (AP) 120 in operation 1106. In operation 1108, the CP 260 of the electronic device 101 may change the first setting value to the second setting value smaller than the first setting value in response to reception of the data inactivity-related event.

According to various embodiments, in operation 1110, the CP 260 of the electronic device 101 may release the RRC connection if the data inactivity timer expires based on the changed second setting value.

Figure 12:
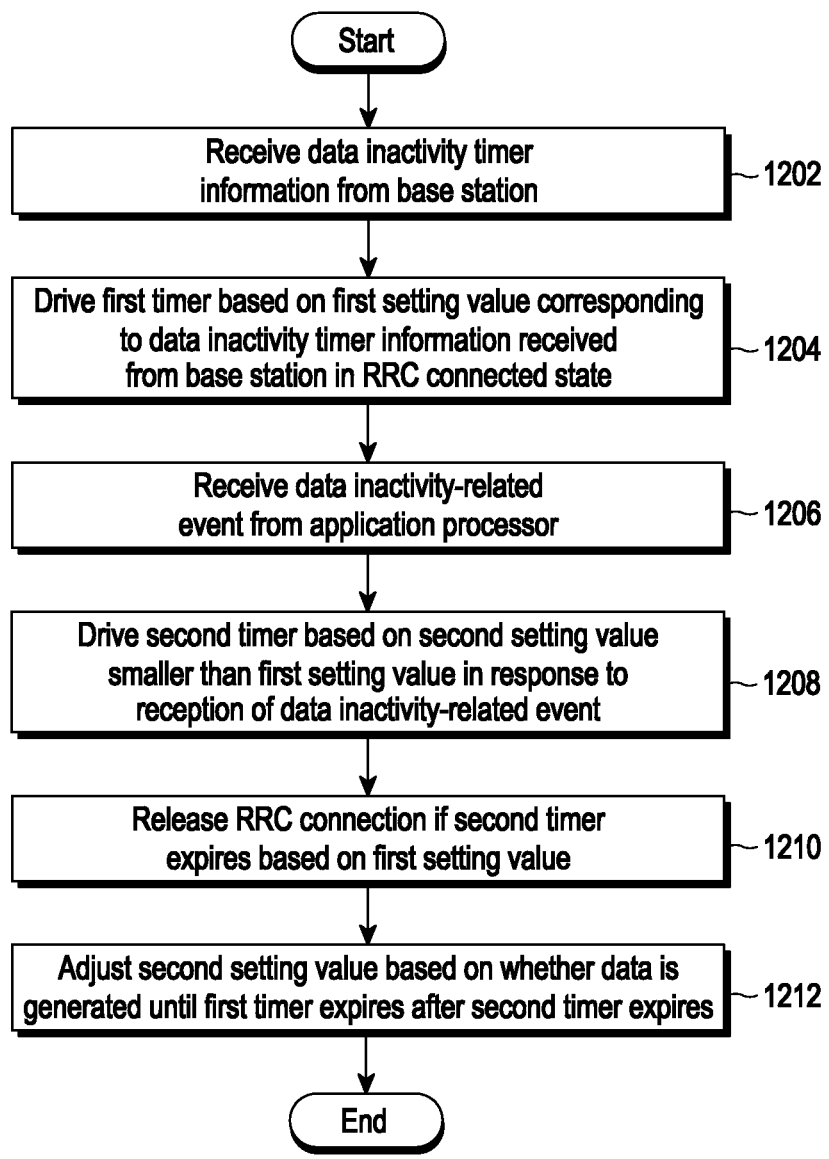
FIG. 12 is a flowchart illustrating an operation for connecting to a communication network by an electronic device according to various embodiments of the present disclosure.

FIG. 12 is a flowchart illustrating an operation for connecting to a communication network by an electronic device according to various embodiments of the present disclosure. Referring to FIG. 12, in operation 1202, the electronic device 101 may receive data inactivity timer ("DataInactivityTimer") information from the base station.

According to various embodiments, in operation 1204, the electronic device 101 may drive the first timer based on the first setting value corresponding to the received data inactivity timer information in the RRC connected state for the base station 400.

According to various embodiments, the communication processor (CP) 260 of the electronic device 101 may receive a data inactivity-related event from the application processor (AP) 120 in operation 1206. In operation 1208, the CP 260 of the electronic device 101 may drive the second timer based on the second setting value smaller than the first setting value in response to reception of the data inactivity-related event.

According to various embodiments, in operation 1210, the CP 260 of the electronic device 101 may release the RRC connection if the second timer operating based on the second setting value expires while the first timer is running.

According to various embodiments, in operation 1212, the electronic device 101 may adjust the second setting value based on whether data is generated until before the first timer expires and after the second timer expires. For example, when transmission/reception data with the base station 400 is generated before the first timer expires, the electronic device 101 may adjust or reset the second setting value to a value increased by a set value. As a result of the identification, when transmission/reception data with the base station 400 is not generated before the first timer expires, the electronic device 101 may adjust or reset the second setting value to a value decreased by a set value.

According to various embodiments, the initial value of the second setting value may be set to ½ of the first setting value. If transmission/reception data is generated after the second timer expires and before the first timer expires, the second setting value may be reset to double the initial value. If transmission/reception data is not generated before the expiration of the first timer and after the expiration of the second timer, the second setting value may be reset from the initial value to ½ of the initial value. The second setting value may be decreased to the minimum value or increased to the maximum value according to the reset.

According to various embodiments, the electronic device 101 may apply the changed second setting value when identifying the data inactivity-related event in the RRC connected state. For example, the electronic device 101 may drive the second timer based on the adjusted or reset second setting value in operation 12120.

According to any one of various embodiments, an electronic device may comprise a wireless communication circuit, an application processor, and a communication processor. The communication processor may be configured to receive data inactivity timer information through the wireless communication circuit from a base station, drive a data inactivity timer based on a first setting value corresponding to the received data inactivity timer information, in an RRC connected state for the base station, receive a data inactivity-related event from the application processor, change the first setting value to a second setting value in response to the reception of the data inactivity-related event, and release an RRC connection for the base station in response to identifying that the data inactivity timer expires based on the changed second setting value.

According to various embodiments, the communication processor may be further configured to control the data inactivity timer to reset or restart based on identifying transmission data or reception data while the data inactivity timer is running.

According to various embodiments, the transmission data or the reception data may include medium access control (MAC) data for at least one logic channel among a dedicated traffic channel (DTCH), a dedicated control channel (DCCH), or a common control channel (CCCH).

According to various embodiments, the second setting value may be set to a smaller constant value than the first setting value.

According to various embodiments, the second setting value may be set to a different value depending on a type of the data inactivity-related event.

According to various embodiments, the data inactivity-related event may include at least one of a display off event, an end event of an application using data, or an end event of a session using data.

According to various embodiments, the second setting value may be set to a changeable variable using a constant value smaller than the first setting value as an initial value.

According to various embodiments, for the second setting value, a minimum unit time value may be set as a minimum value, and the first setting value may be set as a maximum value.

According to various embodiments, the communication processor may be further configured to drive a first data inactivity timer based on the first setting value, drive a second data inactivity timer based on the second setting value, and control to reduce the second setting value by a set value if transmission data or reception data is not identified until before the first data inactivity timer expires after the second data inactivity timer expires.

According to various embodiments, the communication processor may be further configured to drive a first data inactivity timer based on the first setting value, drive a second data inactivity timer based on the second setting value, and control to increase the second setting value by a set value if transmission data or reception data is identified before the first data inactivity timer expires and after the second data inactivity timer expires.

According to any one of various embodiments, a method for controlling connection with a communication network in an electronic device may comprise receiving data inactivity timer information from a base station, by a communication processor, driving a data inactivity timer based on a first setting value corresponding to the received data inactivity timer information, in an RRC connected state for the base station, receiving a data inactivity-related event from an application processor, by the communication processor, changing the first setting value to a second setting value in response to the reception of the data inactivity-related event, and releasing an RRC connection for the base station in response to identifying that the data inactivity timer expires based on the changed second setting value.

According to various embodiments, the method may further comprise resetting or restarting the data inactivity timer based on identifying transmission data or reception data while the data inactivity timer is running.

According to various embodiments, the transmission data or the reception data may include medium access control (MAC) data for at least one logic channel among a dedicated traffic channel (DTCH), a dedicated control channel (DCCH), or a common control channel (CCCH).

According to various embodiments, the second setting value may be set to a smaller constant value than the first setting value.

According to various embodiments, the second setting value may be set to a different value depending on a type of the data inactivity-related event.

According to various embodiments, the data inactivity-related event may include at least one of a display off event, an end event of an application using data, or an end event of a session using data.

According to various embodiments, the second setting value may be set to a changeable variable using a constant value smaller than the first setting value as an initial value.

According to various embodiments, for the second setting value, a minimum unit time value may be set as a minimum value, and the first setting value may be set as a maximum value.

According to various embodiments, the method may further comprise driving a first data inactivity timer based on the first setting value, driving a second data inactivity timer based on the second setting value, and controlling to reduce the second setting value by a set value if transmission data or reception data is not identified until before the first data inactivity timer expires after the second data inactivity timer expires.

According to various embodiments, the method may further comprise driving a first data inactivity timer based on the first setting value, driving a second data inactivity timer based on the second setting value, and controlling to increase the second setting value by a set value if transmission data or reception data is identified before the first data inactivity timer expires and after the second data inactivity timer expires.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising,
a wireless communication circuit; an application processor; and
a communication processor operably connected to the wireless communication circuit and the application processor, the communication processor configured to:
receive, from a base station via the wireless communication circuit, data inactivity timer information,
enable a data inactivity timer based on a first expire time value included in the received data inactivity timer information, wherein the electronic device is in a radio resource control (RRC) connected state for the base station,
based on that a data inactivity-related event occurs, switch, for the data inactivity timer, the first expire time value to a second expire time value that is different from the first expire time value, and release an RRC connection for the base station when the data inactivity timer expires based on the second expire time value;
wherein the communication processor is further configured to:
control the data inactivity timer to reset or restart a time value of the data inactivity timer based on a data transmission or reception while the data inactivity timer runs;
wherein the data transmission or reception includes a medium access control (MAC) data transmission or reception over at least one logical channel comprising at least one of a dedicated traffic channel (DTCH), a dedicated control channel (DCCH), or a common control channel (CCCH).

2. The electronic device of claim 1, wherein the second expire time value is set to a constant value smaller than the first expire time value.

3. The electronic device of claim 2, wherein the second expire time value is set based on a type of the data inactivity-related event.

4. The electronic device of claim 1, wherein the data inactivity-related event includes at least one of a display off event, an end event of an application using data, or an end event of a session using the data.

5. The electronic device of claim 1, wherein the second expire time value is set to a variable value based on a constant value smaller than the first expire time value.

6. The electronic device of claim 4, wherein:
a minimum unit time value for the second expire time value is set to a first value;
the first expire time value is set to a second value; and
the first value is a minimum value and the second value is a maximum value for a time value of the data inactivity timer.

7. The electronic device of claim 4, wherein the communication processor is further configured to:
enable a first data inactivity timer based on the first expire time value;
enable a second data inactivity timer based on the second expire time value; and
reduce the second expire time value by a set value when a data transmission or reception is not identified before the first data inactivity timer expires and after the second data inactivity timer expires.

8. The electronic device of claim 4, wherein the communication processor is further configured to:
enable a first data inactivity timer based on the first expire time value;
enable a second data inactivity timer based on the second expire time value; and
increase the second expire time value by a set value when a data transmission or reception is identified before the first data inactivity timer expires and after the second data inactivity timer expires.

9. A method of an electronic device for controlling a connection with a communication network, the method comprising,
- receiving data inactivity timer information from a base station;
- enabling a data inactivity timer based on a first expire time value included in the received data inactivity timer information, wherein the electronic device in a radio resource control (RRC) connected state for the base station;
- based on that a data inactivity-related event occurs, switch, for the data inactivity timer, the first expire time value to a second expire time value that is different from the first expire time value; and
- releasing an RRC connection for the base station when the data inactivity timer expires based on the second expire time value;
- the method further comprising controlling the data inactivity timer to reset or restart a time value of the data inactivity timer based on a data transmission or reception while the data inactivity timer runs;
- wherein the data transmission or reception includes a medium access control (MAC) data transmission or reception over at least one logical channel comprising at least one of a dedicated traffic channel (DTCH), a dedicated control channel (DCCH), or a common control channel (CCCH).

10. The method of claim 9, wherein the second expire time value is set to a constant value smaller than the first expire time value.

11. The method of claim 10, wherein the second expire time value is set based on a type of the data inactivity-related event.

12. The method of claim 9, wherein the data inactivity-related event may include at least one of a display off event, an end event of an application using data, or an end event of a session using the data.

13. The method of claim 9, wherein the second expire time value is set based on a type of the data inactivity-related event.

14. The method of claim 12, wherein a minimum unit time value for the second expire time value is set to a first value;
- wherein the first expire time value is set to a second value; and
- wherein the first value is a minimum value and the second value is a maximum value for a time value of the data inactivity timer.

15. The method of claim 12, further comprising:
- enabling a first data inactivity timer based on the first expire time value;
- enabling a second data inactivity timer based on the second expire time value; and
- reducing the second expire time value by a set value when a data transmission or reception is not identified before the first data inactivity timer expires and after the second data inactivity timer expires.

16. The method of claim 12, further comprising:
- enabling a first data inactivity timer based on the first expire time value;
- enabling a second data inactivity timer based on the second expire time value; and
- increasing the second expire time value by a set value when a data transmission or reception is identified before the first data inactivity timer expires and after the second data inactivity timer expires.

* * * * *